(12) United States Patent
Cho (10) Patent No.: US 11,814,005 B2
(45) Date of Patent: Nov. 14, 2023

(54) CURTAIN AIRBAG APPARATUS

(71) Applicant: HYUNDAI MOBIS CO., LTD., Seoul (KR)

(72) Inventor: Kwang Soo Cho, Asan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/663,310

(22) Filed: May 13, 2022

(65) Prior Publication Data

US 2022/0388470 A1 Dec. 8, 2022

(30) Foreign Application Priority Data

Jun. 3, 2021 (KR) .................. 10-2021-0072220

(51) Int. Cl.
| | |
|---|---|
| *B60R 21/232* | (2011.01) |
| *B60R 21/235* | (2006.01) |
| *B60R 21/233* | (2006.01) |
| *B60R 21/262* | (2011.01) |
| *B60R 21/231* | (2011.01) |

(Continued)

(52) U.S. Cl.
CPC .......... *B60R 21/232* (2013.01); *B60R 21/233* (2013.01); *B60R 21/235* (2013.01); *B60R 21/262* (2013.01); *B60R 2021/23107* (2013.01); *B60R 2021/23576* (2013.01); *B60R 2021/2612* (2013.01); *B60R 2021/26058* (2013.01)

(58) Field of Classification Search
CPC ... B60R 21/213; B60R 21/232; B60R 21/233; B60R 21/235; B60R 21/237; B60R 21/262; B60R 2021/23107; B60R 2021/23308; B60R 2021/23514; B60R 2021/23576; B60R 2021/23595; B60R 2021/2612; B60R 2021/26058

See application file for complete search history.

(56) References Cited

U.S. PATENT DOCUMENTS 3,795,412 A * 3/1974 John ................. B60R 21/08
　　　　　　　　　　　　　　　　　　　180/274
5,480,181 A * 1/1996 Bark ................. B60R 21/18
　　　　　　　　　　　　　　　　　　　280/730.2

(Continued)

FOREIGN PATENT DOCUMENTS

JP　　　2000335355 A * 12/2000 ........... B60R 21/232
JP　　　2012086721 A *  5/2012

(Continued)

*Primary Examiner* — Laura Freedman
(74) *Attorney, Agent, or Firm* — DLA PIPER LLP (US)

(57) ABSTRACT

A curtain airbag apparatus which can smoothly expand an airbag cushion even with a low gas ejection pressure of an inflator. A curtain airbag apparatus according to an embodiment includes: an outer cushion provided on an upper side of a pillar constituting a vehicle along a forward and backward direction of the vehicle to be expandable; a plurality of inner cushions which are fixed to an inner side of the outer cushion along the forward and backward direction of the vehicle to be spaced apart from each other and are independently expandable; and inflators disposed in the plurality of inner cushions, respectively, so as to eject gas into the inner cushions so that the inner cushions are expanded by generation of the gas.

9 Claims, 6 Drawing Sheets

(51) Int. Cl.
  *B60R 21/26* (2011.01)
  *B60R 21/261* (2011.01)

(56) References Cited

U.S. PATENT DOCUMENTS

| | | | | |
|---|---|---|---|---|
| 6,042,141 A * | 3/2000 | Welch | ............... | B60R 21/232 |
| | | | | 280/730.2 |
| 6,152,481 A * | 11/2000 | Webber | ............... | B60R 21/232 |
| | | | | 280/730.2 |
| 6,276,712 B1 * | 8/2001 | Welch | ............... | B60R 21/232 |
| | | | | 280/730.2 |
| 6,508,487 B2 * | 1/2003 | Koster | ............... | B60R 21/23184 |
| | | | | 280/730.2 |
| 6,695,341 B2 * | 2/2004 | Winarto | ............... | B60R 21/232 |
| | | | | 280/730.2 |
| 6,811,184 B2 * | 11/2004 | Ikeda | ............... | B60R 21/26 |
| | | | | 280/730.2 |
| 7,350,804 B2 * | 4/2008 | Bakhsh | ............... | B60R 21/232 |
| | | | | 280/730.2 |
| 8,474,865 B2 * | 7/2013 | Grindle | ............... | B60R 21/232 |
| | | | | 280/730.2 |
| 8,573,639 B1 * | 11/2013 | Markusic | ............... | B60R 21/232 |
| | | | | 280/730.2 |
| 8,727,376 B2 * | 5/2014 | Goto | ............... | B60R 21/262 |
| | | | | 280/730.2 |
| 8,991,858 B2 * | 3/2015 | Rick | ............... | B60R 21/232 |
| | | | | 280/730.2 |
| 9,096,193 B2 * | 8/2015 | Kalandek | ............... | B60R 21/235 |
| 9,809,189 B2 * | 11/2017 | Grell | ............... | B60R 21/2334 |
| 9,969,346 B2 * | 5/2018 | Patel | ............... | B60R 21/232 |
| 10,960,844 B2 * | 3/2021 | Jimenez | ............... | B60R 21/213 |

FOREIGN PATENT DOCUMENTS

JP   2019010991 A  *  1/2019
KR   2016-0025370      3/2016

* cited by examiner

CURTAIN AIRBAG APPARATUS

CROSS-REFERENCE TO RELATED APPLICATION(S)

This application is based on and claims priority under 35 U.S.C. 119 to Korean Patent Application No. 10-2021-0072220, filed on Jun. 3, 2021, in the Korean Intellectual Property Office, the disclosure of which is herein incorporated by reference in its entirety.

BACKGROUND OF THE INVENTION

Field of the invention

The disclosure relates to a curtain airbag apparatus and, more specifically, to a curtain airbag apparatus capable of efficiently expanding an airbag cushion even with a low gas ejection pressure of an inflator.

Description of the Prior Art

In general, a curtain airbag device is one of devices for protecting occupants from lateral impacts during accidents.

A curtain airbag is disposed above front and rear doors of a vehicle in the forward/backward direction of the vehicle body. For example, a curtain airbag is mounted on a side inner panel mounted in the upper area of A and C pillars of a vehicle and is elongated in the forward/backward direction.

Figure 1A:
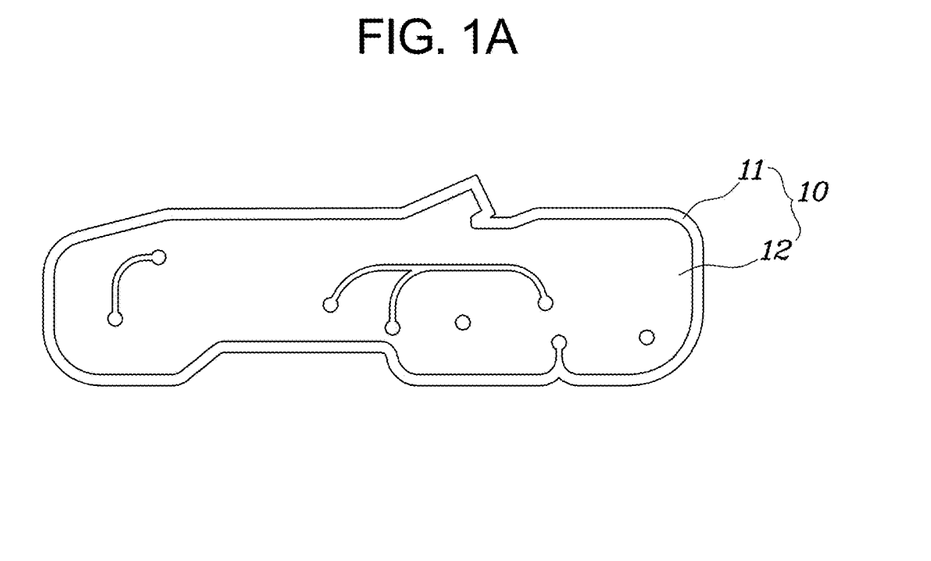
FIG. 1A is a view showing a general curtain airbag apparatus.
Figure 1B:
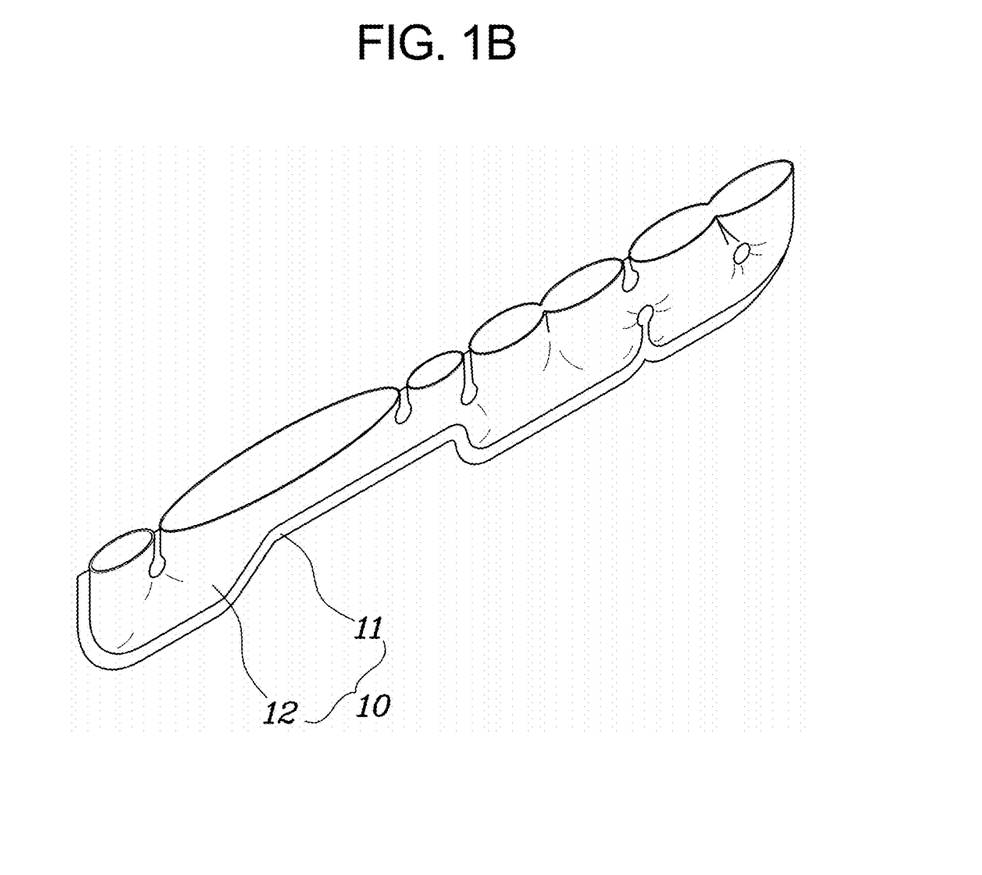
FIG. 1B is a view showing a cross-section of a general curtain airbag apparatus.

FIG. 1A illustrates a general curtain airbag apparatus, and FIG. 1B is a sectional view of the general curtain airbag apparatus.

As illustrated in FIG. 1A, a curtain airbag is fabricated by sewing two sheets of fabric superimposed on each other. In addition, the curtain airbag 10 is equipped with an inflator (not illustrated) capable of ejecting gas therein.

The curtain airbag 10 is expanded and deployed by gas ejected from a single inflator, thereby protecting the occupant from impacts.

A large-capacitor inflator needs to be used because of the wide range of deployment of the curtain airbag 10 and the limited pressure and amount of gas ejected from the inflator, but there is a problem in that, if the inflator has a large capacity, the curtain airbag is fractured by high-temperature/high-pressure gas ejected from the inflator, thereby making it difficult to unlimitedly increase the inflator capacitor.

Therefore, as in FIG. 1B, the curtain airbag 10 is generally sewn to differentiate between a first area 11 which is not expanded because no gas is supplied from the inflator, and a second area 12 which is expanded by gas supplied from the inflator.

Although the curtain airbag is separated into the first area 11 and the second area 12 such that supply of gas from the inflator is concentrated in the second area 12 of the curtain airbag 10, there is a problem in that the curtain airbag may not be deployed at the desired rate, or partial area thereof may not be expanded, because the second area 12 is distributed over a wide range, and the pressure and amount of the gas ejected from the inflator are limited.

The above descriptions regarding background technologies have been made only to help understanding of the background of the disclosure, and are not to be deemed by those skilled in the art to correspond to already-known prior arts.

SUMMARY OF THE INVENTION

The disclosure provides a curtain airbag apparatus capable of efficiently expanding an airbag cushion even with a low gas ejection pressure of a low-capacity inflator.

A curtain airbag apparatus according to an aspect of the disclosure includes: an outer cushion provided on an upper side of a pillar constituting a vehicle along a forward and backward direction of the vehicle to be expandable; a plurality of inner cushions fixed to an inner side of the outer cushion along the forward and backward direction of the vehicle to be spaced apart from each other and to be independently expandable; and inflators disposed in the plurality of inner cushions, respectively, so as to eject gas into the inner cushions so that the inner cushions are expanded by generation of the gas.

The outer cushion may be provided to form an accommodation space therein by overlapping two sheets of fabric and sewing edges thereof, and the plurality of inner cushions may be fixed while being respectively accommodated in the accommodation space of the outer cushion.

The outer cushion may have an expansion part by bending a sheet of fabric at least twice in a Z-shape, and the plurality of inner cushions may be respectively accommodated and fixed in the expansion part of the outer cushion.

The inner cushion may be formed to be symmetrical on both sides along a virtual first folding line, and may be provided such that the inside thereof can be expanded by sewing the edges while being folded along the first folding line.

The inner cushion may have a first sewing line formed along the edge, and a sealing line coated with a sealing material may be formed along a portion where the first sewing line is formed.

The curtain airbag apparatus may further include a guide pocket which is respectively disposed in the inner pocket, to which the inflator is mounted, and which guides the gas ejected from the inflator to the inside of the inner pocket.

The guide pocket may be formed to be symmetrical on both sides along a virtual second folding line, and a portion of the edge may be sewn while being folded along the second folding line to form a gas ejection flow path.

a reinforcing unit which protects the periphery of the area where the gas is ejected from the inflator may be provided in the guide pocket.

The reinforcing unit may be a reinforcing patch which is attached to an inner surface of the guide pocket.

The outer cushion may not be coated with a sealing material, and the inner cushion may be coated with a sealing material.

The inner cushion may be separated and fixed to correspond to a lateral direction of a seat constituting a vehicle.

An embodiment of the disclosure is advantageous in that multiple inner cushions are disposed inside an outer cushion deployed in a wide range on a side of an occupant so as to be expanded and deployed in a concentrated manner, and the inner cushions are equipped with inflators, respectively, such that an airbag cushion can be efficiently expanded and deployed even with a low gas ejection pressure of the inflators.

There is another advantageous effect in that a curtain airbag apparatus may be provided, wherein the number of inner cushions and the positions in which the same are installed can be variously applied such that parts supposed to contact the occupant in the case of an accident are expanded in a concentrated manner, thereby guaranteeing safety of the occupant, and the same can be universally used regardless of the vehicle structure.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION OF THE EXEMPLARY EMBODIMENTS

Hereinafter, embodiments of the disclosure will be described in more detail with reference to the accompanying drawings. However, the disclosure is not limited to the embodiments disclosed below and will be implemented in various different forms, but the embodiments are merely provided to complete the disclosure and completely inform a person ordinarily skilled in the art of the scope of the disclosure. In the drawings, the same reference numerals refer to the same elements.

Figure 2:
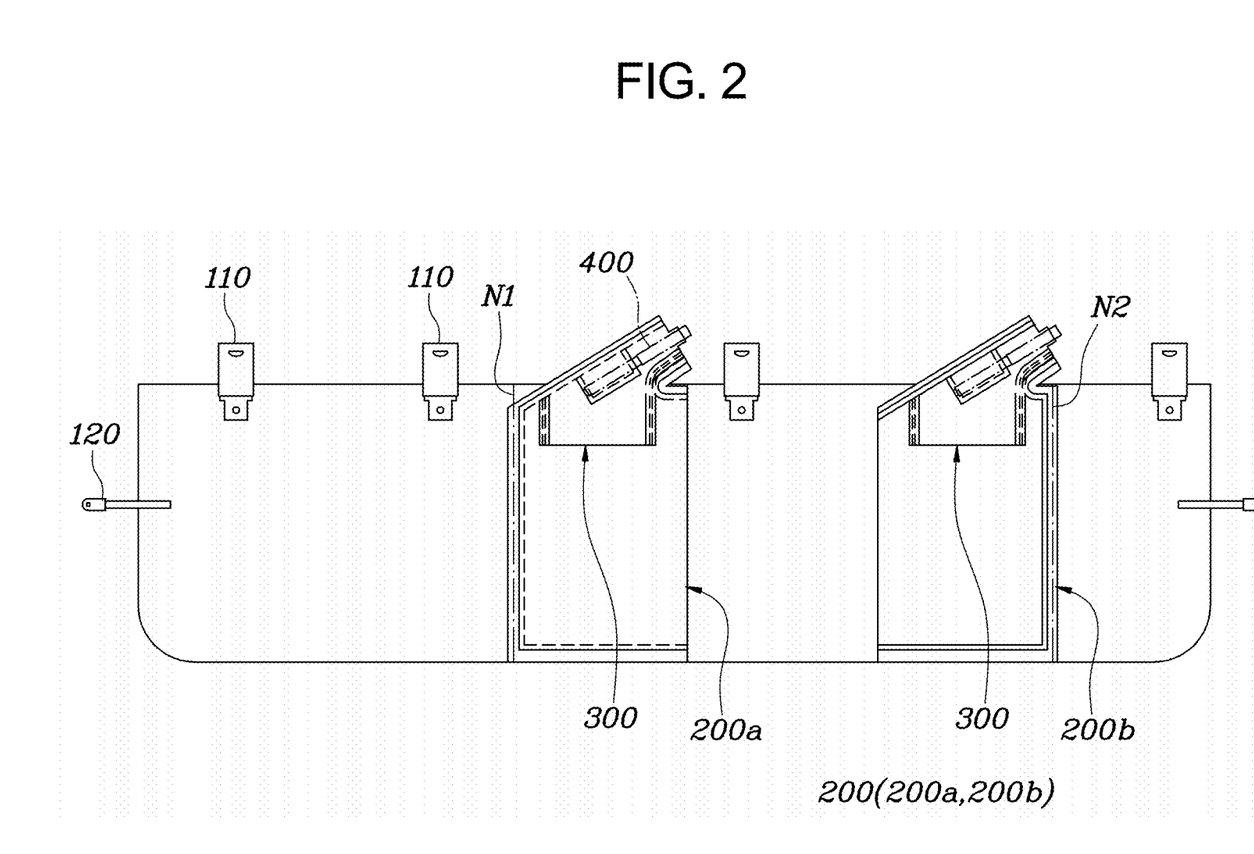
FIG. 2 is a view showing a curtain airbag apparatus according to an embodiment of the disclosure.
Figure 3A:
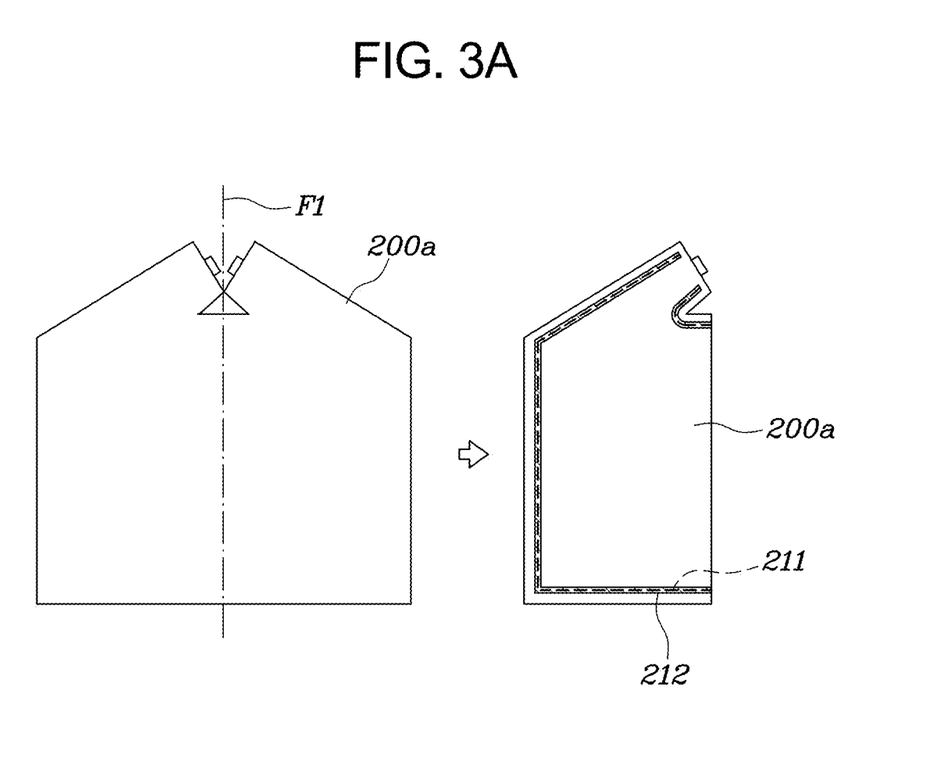
FIG. 3A and FIG. 3B are views showing an inner cushion of a curtain airbag apparatus of the disclosure.
Figure 3B:
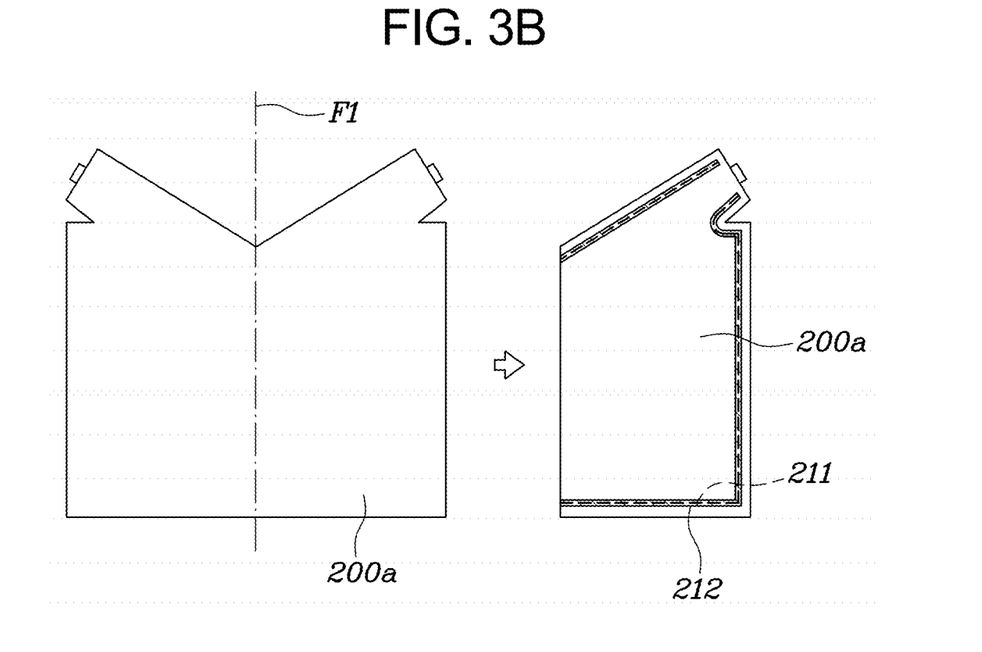
Figure 3C:
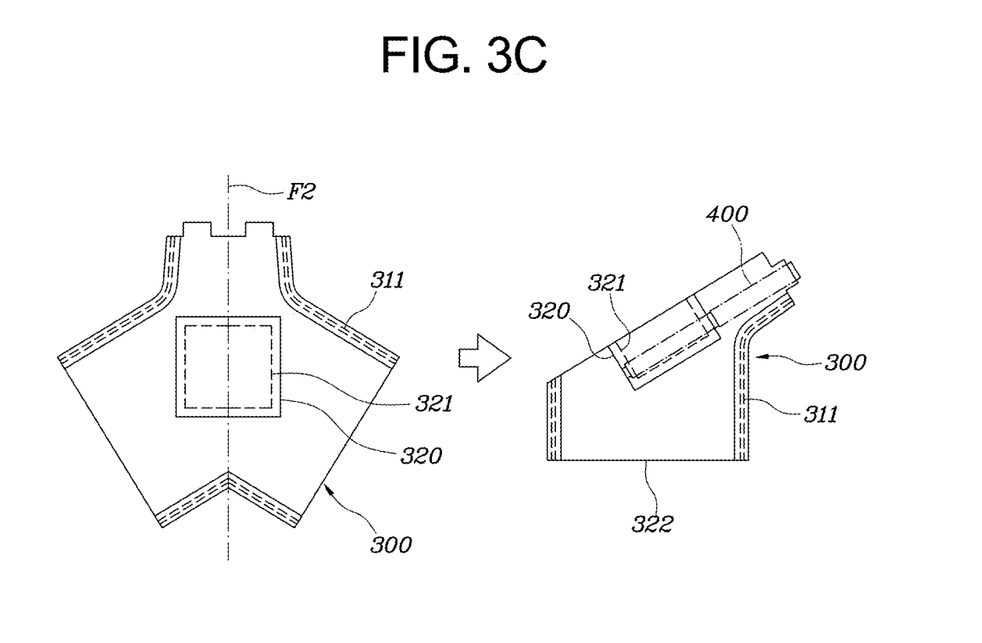
FIG. 3C is a view showing a guide pocket of a curtain airbag apparatus of the disclosure.
Figure 4A:
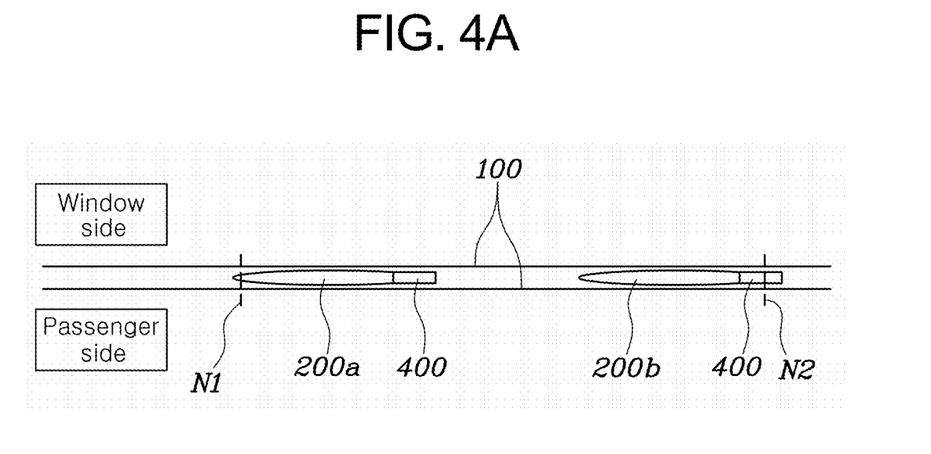
FIG. 4A and FIG. 4B are views showing an operation state of a curtain airbag apparatus according to an embodiment of the disclosure.
Figure 4B:
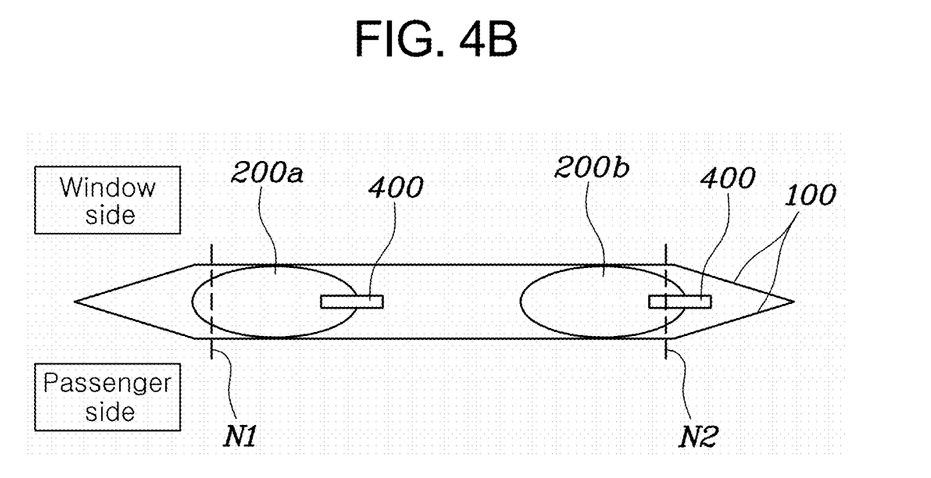
Figure 5A:
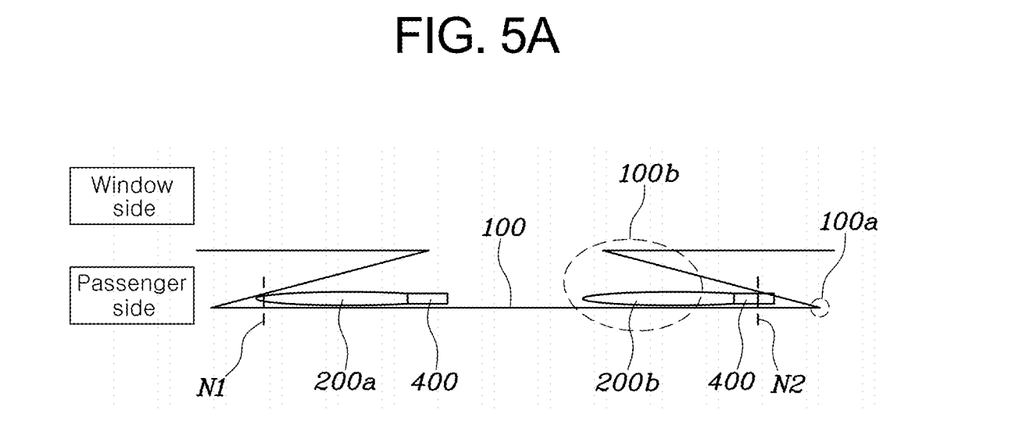
FIG. 5A and FIG. 5B are views showing an operation state of a curtain airbag apparatus according to another embodiment of the disclosure.
Figure 5B:
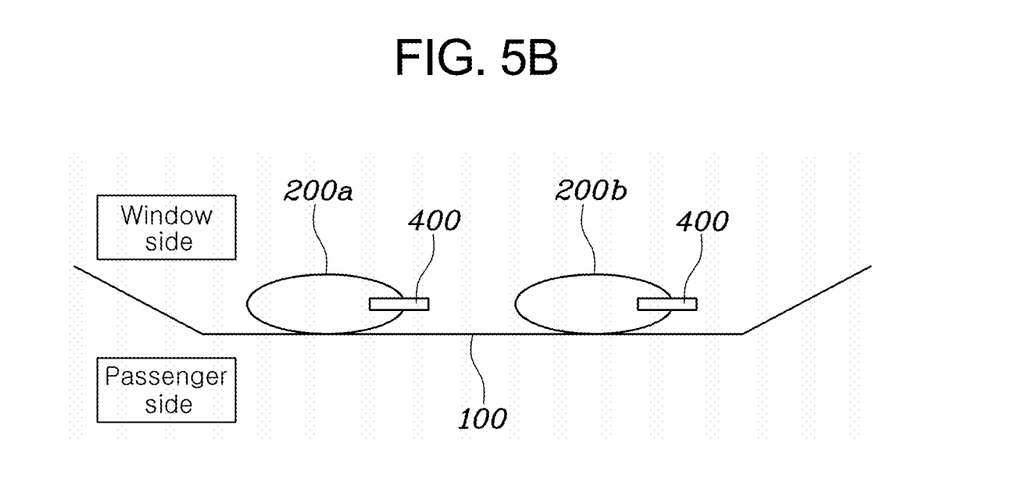

FIG. 2 is a view showing a curtain airbag apparatus according to an embodiment of the disclosure, FIG. 3A and FIG. 3B are views showing an inner cushion of a curtain airbag apparatus of the disclosure, FIG. 3C is a view showing a guide pocket of a curtain airbag apparatus of the disclosure, FIG. 4A and FIG. 4B are views showing an operation state of a curtain airbag apparatus according to an embodiment of the disclosure, and FIG. 5A and FIG. 5B are views showing an operation state of a curtain airbag apparatus according to another embodiment of the disclosure.

A curtain airbag apparatus according to an embodiment of the disclosure and what is illustrated in the drawings is an apparatus which is disposed on an upper side of a front door and a rear door of a vehicle in a forward and backward direction of the vehicle so as to protect a side of a passenger sitting on a seat in a case of a car accident. To this end, the curtain airbag apparatus is longitudinally mounted to the inside of a side inner panel constituting a side portion of a vehicle body in a forward and backward direction.

To specifically describe the curtain airbag apparatus, the curtain airbag apparatus according to an embodiment of the disclosure includes: an outer cushion 100 which is provided on an upper side of a pillar constituting a vehicle along a forward and backward direction of the vehicle to be expandable; a plurality of inner cushions 200 which are fixed to an inner side of the outer cushion 100 along the forward and backward direction of the vehicle to be spaced apart from each other and are independently expandable; and inflators 400 which are respectively disposed in the plurality of inner cushions 200 to eject gas into the inner cushion 200 so that the inner cushion 200 is expanded by the generation of the gas.

In addition, the apparatus further includes a guide pocket 300 which is respectively disposed in the inner pocket 200, to which the inflator 400 is mounted, and which guides the gas ejected from the inflator 400 to the inside of the inner pocket 200.

The outer cushion 100 is a means which widely expands and deploys at a side portion of a passenger, wherein the gas ejected from the inflator 400 is not directly supplied but deploys while expanding by the expansion of the inner cushion 200 disposed therein.

The outer cushion 100 described above may be implemented in various ways which can expand together with the expansion of the inner cushion 200 while accommodating the inner cushion 200 therein.

For example, as illustrated in FIG. 4A and FIG. 4B, the outer cushion 100 may be provided to form an accommodation space therein by overlapping two sheets of fabric and sewing the edge thereof. Therefore, the plurality of inner cushions 200 are fixed while being accommodated therein to be spaced apart from each other.

In addition, as illustrated in FIG. 5A and FIG. 5B, the outer cushion according to another embodiment of the disclosure may be provided to have an expansion part 100b by bending a sheet of fabric at least twice while forming a bent part 100a in a Z-shape. Therefore, the plurality of inner cushions 200 are accommodated and fixed in an area in which the expansion part 100b is formed by overlapping a sheet of fabric. Thus, it is preferable that the number of expansion parts 100b is equal to the number of inner cushions 200.

In addition, since the outer cushion 100 is not directly exposed to the gas ejected from the inflator 400 and is not a means directly expanding while accommodating the gas, it is not necessary to coat the fabric thereof to prevent the gas from leaking. Therefore, it is preferable that the outer cushion 100 is not coated with a sealing material such as silicone. Accordingly, the manufacturing process of the outer cushion 100 can be shortened, and the production unit price can be lowered.

The outer cushion 100 is fixed to a vehicle body by a plurality of mounting tabs 110. In addition, the outer cushion 100 has a plurality of tethers 120 which guide the deployed shape. In this case, the number or attachment position of the mounting tabs 110 and tethers 120 may be variously changed and implemented according to the shape of the outer cushion and the structure of the vehicle.

Meanwhile, the inner cushion 200 is a means which expands while accommodating the gas ejected by the operation of the inflator 400, and deploys while being directly expanded by the gas ejected from the inflator 400 so as to deploy while indirectly expanding the outer cushion 100

In this case, it is preferable that the inner cushion 200 has the size and shape which can be expanded while expanding the outer cushion 100 together therewith and can cover the area in which a passenger comes into direct contact with a side portion of a vehicle. For example, in the embodiment, the inner cushion 200 is formed to have a rectangular shape which forms a long axis in a substantially upward and downward direction so as to facilitate expansion.

Since the inner cushion 200 is a means for directly expanding while accommodating the gas ejected from the inflator 400, it is necessary to coat the fabric to prevent gas leakage. Therefore, it is preferable to coat the fabric made of cloth with a sealing material such as silicone as a whole.

The inner cushion 200 described above is formed to be symmetrical on both sides along a virtual first folding line F1, and is provided such that the inside thereof can be expanded by sewing the edges while being folded along the first folding line F1.

In this case, the inner cushion 200 may be implemented in various shapes according to the position where it is installed and the structure in which the inflator 400 is mounted.

For example, as in FIG. 3A, the inner cushion 200a may be formed such that a mounting hole for mounting the inflator 400 faces the first folding line F1 and is formed to be symmetrical with respect to the first folding line F1.

In addition, as in FIG. 3B, the inner cushion 200b may be formed such that the mounting hole for mounting the inflator 400 faces a direction opposite to the first folding line F1 and is formed to be symmetrical with respect to the first folding line F1.

Meanwhile, the inner cushion 200 has a first sewing line 211 formed along the edge. In this case, the first sewing line 211 is not formed at the position where the mounting hole is formed and the position corresponding to the first folding line F1.

In addition, since the formation of the first sewing line 211 may cause gas leakage in the area where the first sewing line 211 is formed, in order to prevent the gas leakage, it is preferable to form a sealing line 212 coated with a sealing material such as silicone along the portion where the first sewing line 211 is formed.

Therefore, the inner cushion 200 can rapidly expand the inner cushion 200 while the gas ejected from the inflator 400 is accommodated in the inner cushion due to the sealing effect of the coating of the fabric itself and the sealing effect of the sealing line 212.

In addition, a plurality of inner cushions 200 are provided, and in this case, it is preferable that each inner cushion 200 is separated and fixed to correspond to a lateral direction of a seat constituting a vehicle. Therefore, by arranging the inner cushion 200 at a point corresponding to the side portion of the passenger boarding the seat, the passenger can be sufficiently protected by the inner cushion 200 in the event of an accident.

Meanwhile, the guide pocket 300 is a means for guiding the gas ejected from the inflator 400 to flow inside the inner pocket 200 while directly mounting and fixing thereto, wherein the number of guide pockets 300 corresponds to the number of inner pockets 200 and the guide pocket 300 is respectively disposed in the inner pocket 200.

The guide pocket 300 described above is formed to be symmetrical on both sides along a virtual second folding line F2 like the inner pocket 200 and has a second sewing line 311 formed in a portion of the edge thereof while being folded along the second folding line F2 so as to have a gas ejection flow path 322 formed in a portion where the second sewing line 311 is not formed.

In this case, the size of the guide pocket 300 may be any size as long as it is formed to be large enough to accommodate the inflator 400 and guide the gas ejected from the inflator 400 to the inside of the inner cushion 200.

For example, the guide pocket 300 is manufactured to have a size of ⅓ to ¼ of the inner cushion 200 and is arranged at an upper end portion of the inner cushion 200. In this case, it is preferable that the gas ejection flow path 322 formed in the guide pocket 300 is formed in a downward direction of the guide pocket 300 so that the gas can be quickly supplied to the inside of the inner cushion 200 formed to be long in the upward and downward direction.

The guide pocket 300 may also be implemented in various ways in which the inflator 400 is mounted therein to guide the flow of gas ejected from the inflator 400.

In addition, since the guide pocket 300 is not a means which is directly expanded by the gas ejected from the inflator 400, it is not necessary to perform the coating for sealing as in the inner pocket 200.

However, since the guide pocket 300 is directly exposed to the gas ejected from the inflator 400, it is preferable that a reinforcing unit 320 which protects the periphery of the area where the gas is ejected from the inflator 400 is provided in the guide pocket 300 in order to prevent the inner pocket 200 from being damaged while preventing the damage of the guide pocket 300.

Although the reinforcing unit 320 may be implemented in various ways, in the embodiment, the reinforcing unit 320 is implemented by attaching a reinforcing patch formed of a steel plate or fabric made of a thick material onto an inner surface of the guide pocket 300. For example, in the embodiment, the protective patch was attached and then a third sewing line 321 is formed along the edge for the fixation.

Meanwhile, the inflator 400 is a means which expands the inner cushion 200 in the event of an accident, and is provided in a number corresponding to the number of guide pockets 300, and is respectively mounted to the guide pocket 300.

The inflator 400 described above is filled with a gas generating medium for generating gas, and the gas generating medium is ignited by a control signal of a controller in the event of an accident to generate gas. The inflator 400 may be applied in various methods and forms. Compared to a conventional inflator mounted on a curtain airbag which is widely deployed in the lateral area of a vehicle as in the prior art, the inflator applied to the embodiment inflates the inner pocket which expands in a narrow range, and thus an inflator having a relatively small capacity may be applied.

The installation and operation state of the curtain airbag apparatus according to an embodiment of the disclosure configured as described above will be described.

First, as illustrated in FIG. 4A, in the curtain airbag apparatus according to an embodiment of the disclosure, two inner cushions 200a and 200b are arranged in an inner space of the outer cushion 100 formed by sewing the two overlapped sheets of fabric. The guide pocket 300 and the inflator 400 are provided at each of the inner cushions 200.

In addition, the inner cushions 200a and 200b have coupling sewing lines N1 and N2 to be sewn together with the outer cushion 100 for the fixation. In this case, the coupling sewing lines N1 and N2 are preferably formed on the outer periphery of the first sewing line 211 formed on the inner cushions 200a and 200b. Therefore, it prevents gas from leaking through the coupling sewing line in the inner cushions 200a and 200b.

In addition, it is preferable that the coupling sewing lines N1 and N2 are formed only on one side of the inner cushions 200a and 200b. Therefore, the inner cushions 200a and 200b are smoothly expanded.

Therefore, when the inflator 400 is operated by the control signal generated by the controller of the vehicle in the event of an accident and the gas generating medium is ignited to generate gas, as illustrated in FIG. 4B, the gas ejected from the inflator 400 is ejected into the guide pocket 300 and then is supplied to the inside of the inner cushions 200a and 200b via the gas ejection flow path 322 so as to expand and deploy the inner cushions 200a and 200b.

As the inner cushions 200a and 200b expand in this way, the outer cushion 100 that surrounds the outside of the inner cushions 200a and 200b also expands as much as the inner cushions 200a and 200b expand so as to widely protect the lateral part of the passenger.

Next, as illustrated in FIG. 5A, in the curtain airbag apparatus according to another embodiment of the disclosure, a sheet of fabric is folded into a Z-shape to form two expansion parts 100b. In addition, the inner cushions 200a and 200b are arranged in the area where the expansion part 100b is formed, respectively. In this case, the guide pocket 300 and the inflator 400 are provided at each of the inner cushions 200a and 200b.

In addition, the inner cushions 200a and 200b have coupling sewing lines N1 and N2 to be sewn together with the outer cushion 100 for the fixation. In this case, it is preferable that the coupling sewing lines N1 and N2 are formed at points adjacent to the bent part 100a of the outer cushion 100 and formed on the outer periphery of the first sewing line 211 formed on the inner cushions 200a and 200b . Therefore, while the inner cushions 200a and 200b expand and the bent part 100a and the expansion part 100b of the outer cushion 100 expand, a space in which the inner cushions 200a and 200b expand is provided.

Therefore, when the inflator 400 is operated by a control signal generated by the controller of a vehicle in the event of an accident and the gas generating medium is ignited to generate gas, as illustrated in FIG. 5B, the gas ejected from the inflator 400 is ejected into the guide pocket 300 and then is supplied to the inside of the inner cushions 200a and 200b via the gas ejection flow path 322 so as to expand and deploy the inner cushions 200a and 200b.

As the inner cushions 200a and 200b expand in this way, the bent part 100a and the expansion part 100b of the outer cushion 100 which surrounds the outside of the inner cushions 200a and 200b are unfolded as much as the inner cushions 200a and 200b expand so as to widely protect the lateral part of the passenger.

Although the invention has been described with reference to the accompanying drawings and the preferred embodiments described above, the invention is not limited thereto and is limited by the claims described below. Therefore, those skilled in the art can variously change and modify the invention within the range not departing from the technical spirit of the claims described later.

What is claimed is:

1. A curtain airbag apparatus comprising:
an outer cushion configured to be provided on an upper side of a pillar of a vehicle along a forward and backward direction of the vehicle and being expandable by having an expansion part formed by bending a sheet of fabric at least twice in a Z-shape;
a plurality of inner cushions accommodated and fixed in the expansion part of the outer cushion along the forward and backward direction of the vehicle and being spaced apart from each other and independently expandable; and
inflators disposed in the plurality of inner cushions and configured to eject gas into the inner cushions so that the inner cushions are expanded by generation of the gas.

2. The curtain airbag apparatus of claim 1,
wherein at least one of the inner cushions is configured to be symmetrical on both sides along a virtual first folding line, such that an inside thereof can be expanded while being folded along the first folding line.

3. The curtain airbag apparatus of claim 2,
wherein the at least one of the inner cushions has a first sewing line formed along an edge, and
a sealing line coated with a sealing material is formed along a portion where the first sewing line is formed.

4. The curtain airbag apparatus of claim 1, further comprising a guide pocket disposed in an inner pocket to which at least one of the inflators is mounted, and which is configured to guide the gas ejected from the at least one of the inflators to an inside of the inner pocket.

5. The curtain airbag apparatus of claim 4,
wherein the guide pocket is configured to be symmetrical on both sides along a virtual folding line, and a portion of an edge is sewn while being folded along a second folding line to form a gas ejection flow path.

6. The curtain airbag apparatus of claim 5,
wherein a reinforcing unit which protects a periphery of an area where the gas is ejected from the inflator is within the guide pocket.

7. The curtain airbag apparatus of claim 6,
wherein the reinforcing unit is a reinforcing patch attached to an inner surface of the guide pocket.

8. The curtain airbag apparatus of claim 1,
wherein the outer cushion is not coated with a sealing material, and
at least one of the inner cushions is coated with a sealing material.

9. The curtain airbag apparatus of claim 1,
wherein at least one of the inner cushions is configured to be separated and fixed to correspond to a lateral direction of a seat within the vehicle.

* * * * *